US011617208B2

(12) United States Patent
Agiwal et al.

(10) Patent No.: US 11,617,208 B2
(45) Date of Patent: Mar. 28, 2023

(54) METHOD AND APPARATUS FOR RANDOM ACCESS PROCEDURE

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 17/033,465

(22) Filed: Sep. 25, 2020

(65) Prior Publication Data

US 2021/0105828 A1    Apr. 8, 2021

Related U.S. Application Data

(60) Provisional application No. 62/909,557, filed on Oct. 2, 2019.

(51) Int. Cl.
*H04W 74/08* (2009.01)
*H04W 74/04* (2009.01)
*H04W 72/14* (2009.01)
*H04B 17/327* (2015.01)
*H04L 5/00* (2006.01)
*H04W 4/70* (2018.01)

(52) U.S. Cl.
CPC ...... *H04W 74/0833* (2013.01); *H04B 17/327* (2015.01); *H04L 5/001* (2013.01); *H04W 72/14* (2013.01); *H04W 74/04* (2013.01); *H04W 4/70* (2018.02)

(58) Field of Classification Search
CPC ............ H04W 74/0833; H04W 74/04; H04W 742/14; H04B 17/327; H04B 17/318; H04L 5/001
See application file for complete search history.

(56) References Cited

U.S. PATENT DOCUMENTS

2010/0189071 A1* 7/2010 Kitazoe ............... H04W 74/002
                                                   370/328
2013/0083695 A1   4/2013 Narasimha et al.
2014/0301330 A1* 10/2014 Lee ................... H04W 74/0833
                                                   370/329
(Continued)

FOREIGN PATENT DOCUMENTS

EP            3506713 A1    7/2019

OTHER PUBLICATIONS

Supplementary European Search Report dated Feb. 21, 2022, in connection with European Application No. 20870432.0, 15 pages.
(Continued)

*Primary Examiner* — James P Duffy

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides method and apparatus of performing random access procedure.

20 Claims, 5 Drawing Sheets

(56) References Cited

U.S. PATENT DOCUMENTS

| | | | |
|---|---|---|---|
| 2019/0208548 A1 | 7/2019 | Shih et al. | |
| 2019/0274169 A1 | 9/2019 | Tsai et al. | |
| 2020/0100297 A1 | 3/2020 | Agiwal et al. | |
| 2021/0120581 A1* | 4/2021 | Kim | H04W 72/14 |
| 2021/0385867 A1* | 12/2021 | Futaki | H04W 74/0833 |

OTHER PUBLICATIONS

Fujitsu, et al., "Dedicated preamble support in 2-step RACH," R2-1911402, 3GPP TSG-RAN WG2 Meeting #107, Prague, Czech Republic, Aug. 26-30, 2019, 4 pages.

ZTE, et al., "On 2-Step RACH Procedures," R1-1903879, 3GPP TSG RAN WG1 Meeting #96bis, Xian, China, Apr. 8-12, 2019, 10 pages.

Communication pursuant to Rule 164(1) EPC dated Nov. 3, 2021, in connection with European Application No. 20870432.0, 12 pages.

Huawei, et al., "RACH type switching between 2-steps, 4-steps RACH and CFRA," R2-1907733, 3GPP TSG-RAN WG2 Meeting 106, Reno, Nevada, US Apr. 13-May 17, 2019, 7 pages.

Samsung, "Remaining details on PRACH procedure", 3GPP TSG RAN WG1 Meeting 91, Nov. 27-Dec. 1, 2017, R1-1720278, 18 pages.

Vivo, "Considerations on the 2-step RACH procedure", 3GPP TSG-RAN WG2 Meeting #105bis, Apr. 8-12, 2019, R2-1903077, 7 pages.

CMCC, "Discussion on Procedure of 2-Step RACH", 3GPP TSG RAN WG1 #98bis, Oct. 14-20, 2019, R1-1910160, 7 pages.

International Search Report dated Dec. 30, 2020 in connection with International Patent Application No. PCT/KR2020/012816, 3 pages.

Written Opinion of the International Searching Authority dated Dec. 30, 2020 in connection with International Patent Application No. PCT/KR2020/012816, 4 pages.

\* cited by examiner

METHOD AND APPARATUS FOR RANDOM ACCESS PROCEDURE

CROSS-REFERENCE TO RELATED APPLICATION

This application claims the benefit of Provisional Application No. 62/909,557, filed Oct. 2, 2019, the disclosure of which is incorporated by reference herein in its entirety.

BACKGROUND

1. Field

The disclosure relates to a wireless communication system. Specifically, the disclosure relates to an apparatus, a method and a system for a random access procedure in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on random access procedure in 5G communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises identifying that a random access procedure is initiated; selecting a random access (RA) type for the random access procedure among a 2-step RA and a 4-step RA, based on whether a contention-free random access resource is configured for a bandwidth part (BWP) associated with the random access procedure; and performing the random access procedure based on the selected RA type.

In accordance with another aspect of the disclosure, a method performed by a terminal is provided. The method comprises transmitting, to a base station, a message A including a random access preamble and a payload for a random access procedure; receiving, from the base station, a message B including fallback random access response (RAR) medium access control (MAC) sub protocol data unit (subPDU), wherein the fallback RAR MAC subPDU includes a random access preamble identifier (RAPID) matching the random access preamble and an uplink grant; identifying whether the random access preamble was selected among contention-based random access preambles or contention-free random access preambles; and transmitting, to the base station, the payload based on the uplink grant.

In accordance with another aspect of the disclosure, a terminal is provided. The terminal comprises a transceiver configured to transmit and receive a signal; and a controller configured to: identify that a random access procedure is initiated, select a random access (RA) type for the random access procedure among a 2-step RA and a 4-step RA, based on whether a contention-free random access resource is configured for a bandwidth part (BWP) associated with the random access procedure, and perform the random access procedure based on the selected RA type.

In accordance with another aspect of the disclosure, a terminal is provided. The terminal comprises a transceiver configured to transmit and receive a signal; and a controller configured to: transmit, to a base station, a message A including a random access preamble and a payload for a random access procedure, receive, from the base station, a message B including fallback random access response (RAR) medium access control (MAC) sub protocol data unit (subPDU), wherein the fallback RAR MAC subPDU includes a random access preamble identifier (RAPID) matching the random access preamble and an uplink grant, identify whether the random access preamble was selected among contention-based random access preambles or contention-free random access preambles, and transmit, to the base station, the payload based on the uplink grant.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
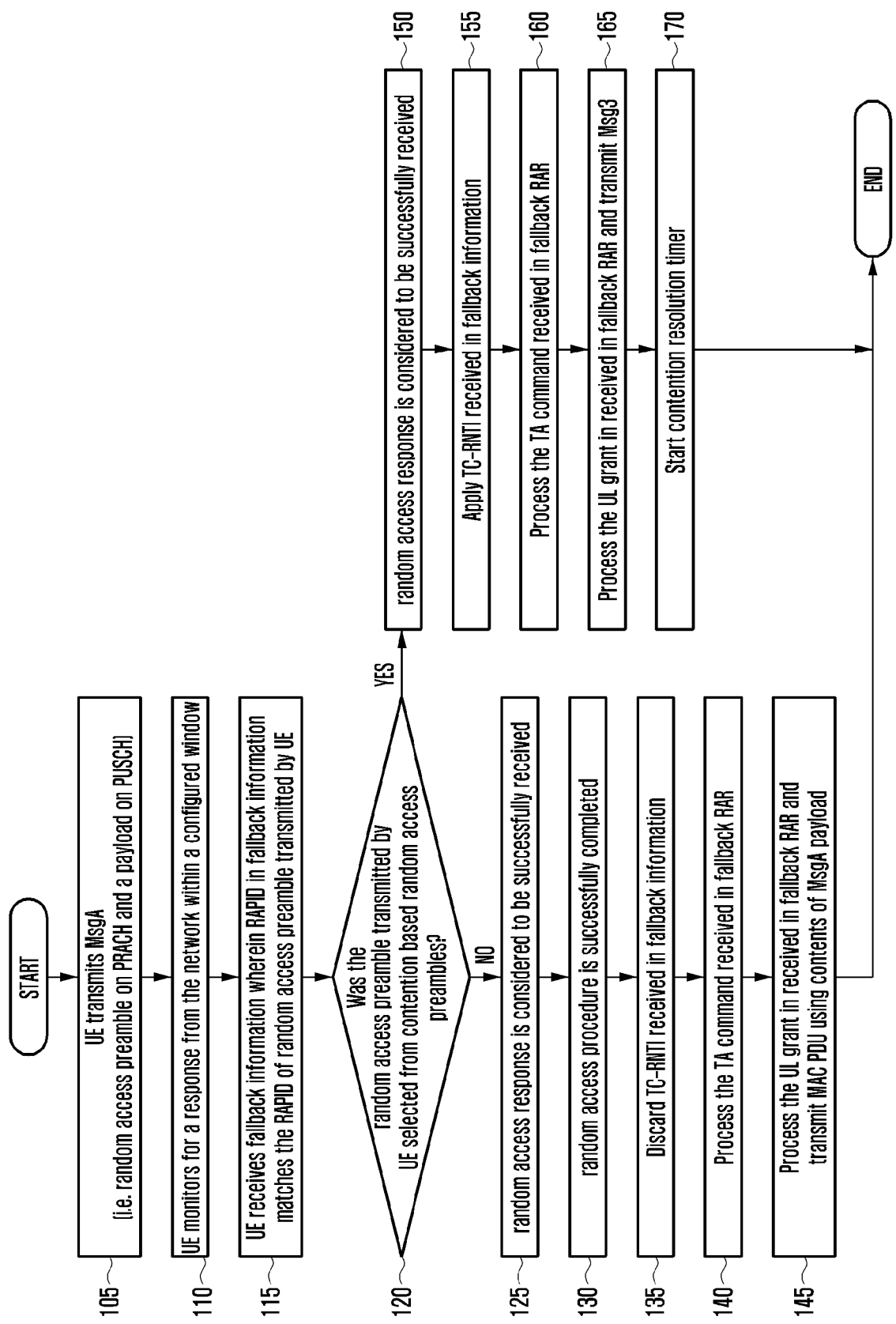
FIG. 1 illustrates a flow chart of a method for performing random access procedure in accordance with an embodiment of the disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or next generation node B (gNB).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or new radio (NR)) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc.

However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, a UE and a gNB communicate with each other using Beamforming. Beamforming techniques are used to mitigate the propagation path losses and to increase the propagation distance for communication at higher frequency band.

Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MN is connected to the core network. NR also supports multi-RAT dual connectivity (MR-DC) operation whereby a UE in radio resource control (RRC) CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB).

In NR for a UE in RRC CONNECTED not configured with carrier aggregation (CA)/DC, there is only one serving cell comprising of the primary cell. For a UE in RRC CONNECTED configured with CA/DC the term "serving cells" is used to denote the set of cells comprising of the special Cell(s) and all secondary cells. In NR the term master cell group (MCG) refers to a group of serving cells associated with the master node, comprising of the PCell and optionally one or more SCells. In NR the term secondary cell group (SCG) refers to a group of serving cells associated with the secondary node, comprising of the primary SCG cell (PSCell) and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, SCell is a cell providing additional radio resources on top of special cell. PSCell refers to a serving cell in SCG in which the UE performs random access when performing the reconfiguration with sync procedure. For dual connectivity operation the term SpCell (i.e., special cell) refers to the PCell of the MCG or the PSCell of the SCG, otherwise the term special cell refers to the PCell.

In the fifth generation wireless communication system, node B (gNB) or base station in cell broadcast synchronization signal and PBCH block (SSB) consists of primary synchronization signal (PSS) and secondary synchronization signal (SSS) and system information. System information includes common parameters needed to communicate in cell. In the fifth generation wireless communication system, system information (SI) is divided into the master information block (MIB) and a number of system information blocks (SIBs) where:

the MIB is always transmitted on the PBCH with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the fifth generation wireless communication system, physical downlink control channel (PDCCH) is used to schedule downlink (DL) transmissions on physical downlink shared channel (PDSCH) and uplink (UL) transmissions on physical uplink shared channel (PUSCH), where the downlink control information (DCI) on PDCCH includes: Downlink assignments containing at least modulation and coding format, resource allocation, and hybrid automatic repeat request (HARD) information related to DL-SCH; Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block (PRB)(s) and orthogonal frequency division multiplexing (OFDM) symbol(s) where the UE may assume no transmission is intended for the UE; Transmission of transmission power control (TPC) commands for physical uplink control channel (PUCCH) and PUSCH; Transmission of one or more TPC commands for sounding reference signal (SRS) transmissions by one or more UEs; Switching a UE's active bandwidth part (BWP); Initiating a random access procedure.

A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by a gNB for each configured BWP wherein each search configuration is uniquely identified by an identifier. Identifier of search space configuration to be used for specific purpose such as paging reception, SI reception, random access response reception is explicitly signaled by the gNB. In NR search space configuration comprises of parameters Monitoring-periodicity-PDCCH-slot, Monitoring-offset-PDCCH-slot, Monitoring-symbols-PDCCH-within-slot and duration.

A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots "x" to x+duration where the slot with number "x" in a radio frame with number "y" satisfies the equation 1 below:

$$(y*(\text{number of slots in a radio frame})+x-\text{Monitoring-offset-PDCCH-slot})\mod(\text{Monitoring-periodicity-PDCCH-slot})=0; \quad [\text{equation 1}]$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of CORESET configuration associated with it. A list of CORESET configurations are signaled by a gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of transmission configuration indicator (TCI) states. One DL reference signal (RS) ID (either SSB or channel state information reference signal (CSI-RS)) is configured per TCI state. The list of TCI states corresponding to a CORESET configuration is signaled by the gNB via RRC signaling. One of the TCI state in TCI state list is activated and indicated to a UE by the gNB. TCI state indicates the DL TX beam (DL TX beam is quasi-collocated (QCLed) with SSB/CSI-RS of TCI state) used by the gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services).

A subset of the total cell bandwidth of a cell is referred to as a bandwidth part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, the UE is configured with one or more DL and UL BWPs, for each configured serving cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of random access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer, the UE switches to the active DL BWP to the default DL BWP or initial DL BWP (if default DL BWP is not configured).

In the 5G wireless communication system, random access (RA) is supported. random access (RA) is used to achieve UL time synchronization. RA is also used during initial access, handover, radio resource control (RRC) connection re-establishment procedure, scheduling request transmission, SCG addition/modification, beam failure recovery and data or control information transmission in UL by a non-synchronized UE in RRC CONNECTED state. Several types of random access procedure are supported.

Contention based random access (CBRA): This is also referred as 4 step CBRA or Type 1 CBRA. In this type of random access, a UE first transmits random access preamble (also referred as Msg1) and then waits for random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where a UE has transmitted Msg1, i.e., RA preamble; 0≤s id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

Several RARs for various random access preambles detected by a gNB can be multiplexed in the same RAR media access control (MAC) protocol data unit (PDU) by the gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to first step i.e., select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection resume, RRC connection re-establishment request, RRC handover confirm, scheduling request, SI request etc. Msg3 may also include data form one or more data radio bearers. It may include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in Msg3, contention resolution is considered successful, contention resolution timer is stopped and RA procedure is completed. While the contention resolution timer is running and the UE has not included C-RNTI in Msg3, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Contention free random access (CFRA): This is also referred as legacy CFRA or 4 step CFRA or Type 1 CFRA. CFRA procedure is used for scenarios such as handover where low latency is required, timing advance establishment for secondary cell (Scell), etc. evolved node B (eNB) assigns to a UE dedicated random access preamble. A UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by a gNB in RACH configuration) number of times, the UE retransmits the RA preamble.

For certain events such has handover and beam failure recovery if dedicated preamble(s) are assigned to a UE, during first step of random access i.e., during random access resource selection for Msg1 transmission, the UE determines whether to transmit dedicated preamble or non-dedicated preamble. Dedicated preambles is typically provided for a subset of SSBs/CSI-RSs. If there is no SSB/CSI-RS having DL reference signal received power (SS-RSRP/CSI-RSRP) above a threshold amongst the SSBs/CSI-RSs for which contention free random access resources (i.e., dedicated preambles/RACH occasions (ROs)) are provided by a gNB, a UE select non-dedicated preamble. Otherwise the UE selects dedicated preamble. So during the RA procedure, one random access attempt can be CFRA while other random access attempt can be CBRA. Type 1 CFRA and Type 1 CBRA as described above is also referred as Type 1 RA or 4 step RA.

2 step contention based random access (2 step CBRA): This also referred as Type 2 CBRA. In the first step, the UE transmits random access preamble on PRACH and a payload (i.e., MAC PDU) on PUSCH. The random access preamble and payload transmission is also referred as MsgA. The payload is also referred as MsgA payload. In the second step, after MsgA transmission, the UE monitors for a response from the network (i.e., gNB) within a configured window. The response is also referred as MsgB. If CCCH SDU was transmitted in MsgA payload, the UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if the UE receives PDCCH addressed to C-RNTI.

If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, a UE transmits Msg3 and perform contention resolution using Msg4 as in CBRA procedure. If contention resolution is successful, random access procedure is considered successfully completed. If contention resolution fails upon fallback (i.e., upon transmitting Msg3), the UE retransmits MsgA. If configured window in which the UE monitors network response after transmitting MsgA expires and the UE has not received MsgB including contention resolution information or fallback information as explained above, the UE retransmits MsgA. If the random access procedure is not successfully completed even after transmitting the MsgA configurable number of times, the UE fallbacks to 4 step RACH procedure (i.e., Type 1 RA or 4 step RA as described earlier).

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include a UE ID (e.g., random ID, S-TMSI, C-RNTI, resume ID, etc.) along with preamble in first step. The UE ID may be included in the MAC PDU of the MsgA. The UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE perform RA in IDLE state after it is attached to network, the UE ID is S-TMSI. If the UE has an assigned C-RNTI (e.g., in connected state), the UE ID is C-RNTI. In case the UE is in INACTIVE state, the UE ID is a resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): This is also referred as Type 2 CFRA. In this case a gNB assigns to a UE dedicated random access preamble(s) and PUSCH resource(s) for MsgA transmission. RO(s) to be used for preamble transmission may also be indicated. In the first step, the UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If the UE receives PDCCH addressed to C-RNTI, random access procedure is considered successfully completed. Type 2 CFRA and Type 2 CBRA as described above are also referred as Type 2 RA or 2 step RA.

For certain events such as handover and beam failure recovery, if dedicated preamble(s) and PUSCH resource(s) are assigned to UE, during first of random access i.e., during random access resource selection for MsgA transmission, the UE determines whether to transmit dedicated preamble or non-dedicated preamble. Dedicated preambles are typically provided for a subset of SSBs/CSI-RSs. If there is no SSB/CSI-RS having DL RSRP above a threshold amongst the SSBs/CSI-RSs for which contention free random access resources (i.e., dedicated preambles/ROs/PUSCH resources) are provided by a gNB, the UE selects non-dedicated preamble. Otherwise, the UE select dedicated preamble. So during the RA procedure, one random access attempt can be 2 step CFRA while other random access attempt can be 2 step CBRA.

Upon initiation of random access procedure, a UE first selects the carrier (SUL or NUL) of serving cell on which RA is initiated. If the carrier to use for the random access procedure is explicitly signaled by a gNB, the UE selects the signaled carrier for performing random access procedure. If the carrier to use for the random access procedure is not explicitly signaled by gNB; and if the Serving Cell for the random access procedure is configured with supplementary uplink and if the RSRP of the downlink pathloss reference is less than rsrp-ThresholdSSB-SUL: the UE selects the SUL carrier for performing random access procedure. Otherwise, the UE selects the NUL carrier for performing random access procedure. Upon selecting the UL carrier, the UE determines the UL and DL BWP for random access procedure as follows:

1> if PRACH occasions are not configured for the active UL BWP:
  2> switch the active UL BWP to BWP indicated by initialUplinkBWP;
  2> if the Serving Cell is an SpCell:
    3> switch the active DL BWP to BWP indicated by initialDownlinkBWP.
1> else:
  2> if the Serving Cell is an SpCell:
    3> if the active DL BWP does not have the same bwp-Id as the active UL BWP:
      4> switch the active DL BWP to the DL BWP with the same bwp-Id as the active UL BWP.
1> perform the random access procedure on the active DL BWP of SpCell and active UL BWP of this serving cell.

The UE then determines whether to perform 2 step or 4 step RACH for this random access procedure.

Meanwhile, both CBRA (i.e., 4 step CBRA and 2 step CBRA) can be configured in a cell. In this case RSRP threshold for selection between 2 step CBRA and 4 step CBRA is configured by a gNB. If DL RSRP is greater than a threshold, the UE perform 2 step CBRA. Otherwise 4 step CBRA. For a handover, the UE receives RRCReconfiguration message. The RRCReconfiguration message includes target cell's common and dedicated configuration. RSRP threshold for 2 step RA and 4 step RA selection can be received in both common and dedicated configuration. During handover to reduce latency, CFRA and 2 step CFRA resources may also be configured in addition to 4 step CBRA and 2 step CBRA. So a mechanism is needed for the UE to determine how to perform RA considering these multiple configurations and RSRP thresholds.

Embodiment 1—Network Response for 2 Step CFRA

FIG. 1 illustrates a flow chart of a method for performing random access procedure in accordance with an embodiment of the disclosure.

A UE transmits random access preamble on PRACH and a payload (i.e., MAC PDU) on PUSCH to base station (105). The random access preamble and payload transmission are also referred as MsgA. The payload is also referred as MsgA payload. Contention free random access resources (i.e., dedicated preamble/PUSCH resource/RO) are used for transmitting MsgA.

After MsgA transmission using the contention free random access resources, the UE monitors for a response from the network (i.e., gNB) within a configured window (110). In one embodiment, if a UE receives PDCCH addressed to C-RNTI, random access response is considered to be successfully received and random access procedure is successfully completed.

In another embodiment, if a UE receives PDCCH addressed to C-RNTI and scheduled DL transport block (TB) includes 12 bit timing advance (TA) command (12 bit TA command can be included in a MAC CE), random access response is considered to be successfully received and random access procedure is successfully completed.

In another embodiment, if a UE is not UL synchronized i.e., time alignment timer (TAT) timer is not running and if the UE receives PDCCH addressed to C-RNTI and scheduled DL TB includes 12 bit TA command (12 bit TA command can be included in a MAC CE), random access response is considered to be successfully received and random access procedure is successfully completed.

In another embodiment, if a UE is UL synchronized i.e., TAT timer is running and if the UE receives PDCCH addressed to C-RNTI, random access response is considered to be successfully received and random access procedure is successfully completed.

In another embodiment, if a UE receives PDCCH addressed to MsgB-RNTI and received TB scheduled by this PDCCH is successfully decoded and MsgB includes fallback information (i.e., fallbackRAR MAC subPDU is included in MsgB) wherein RAPID in fallback information matches the RAPID of random access preamble transmitted by the UE (115), random access response is considered to be successfully received and random access procedure is successfully completed (125, 130). The UE discards the temporary C-RNTI (TC-RNTI) received in fallback information (135). The UE processes and applies the TA command received in fallback RAR for the serving cell where MsgA was transmitted (140). In an embodiment, if 2 step CFRA is supported only for SpCell, MsgA is transmitted on SpCell and hence TA command received in fallback RAR is applied for SpCell. In the UL grant received in fallback RAR, the UE transmits MAC PDU using contents of MsgA payload (145) i.e., the UE obtains the MAC PDU from MsgA buffer and transmits it in the UL grant received in fallback RAR. Note that the above-mentioned steps are performed, if the random access preamble transmitted by the UE during MsgA transmission was selected from contention free random access preambles (120).

Meanwhile, handling of fallback information (as described above) in case of MsgA transmitted using contention free random access resources is different than handling of fallback information in case of MsgA transmitted using contention based random access resources. In case MsgA is transmitted using contention based random access resources, upon receiving fallback information wherein RAPID in fallback information matches the RAPID of random access preamble transmitted by the UE (115, 120), random access response is considered to be successfully received but random access procedure is not considered successfully completed (150), the UE applies TC-RNTI (TC-RNTI is used to receive PDCCH for Msg3 retransmission and PDCCH for Msg4) (155), processes the received TA command for the serving cell where MsgA was transmitted and transmit Msg3 in received UL grant (160, 165), upon transmitting Msg3, the UE starts contention resolution timer and wait for contention resolution message i.e., Msg4 from the gNB (170).

Embodiment 2—Handling Multiple RSRP Thresholds for RA Selection

Figure 2:
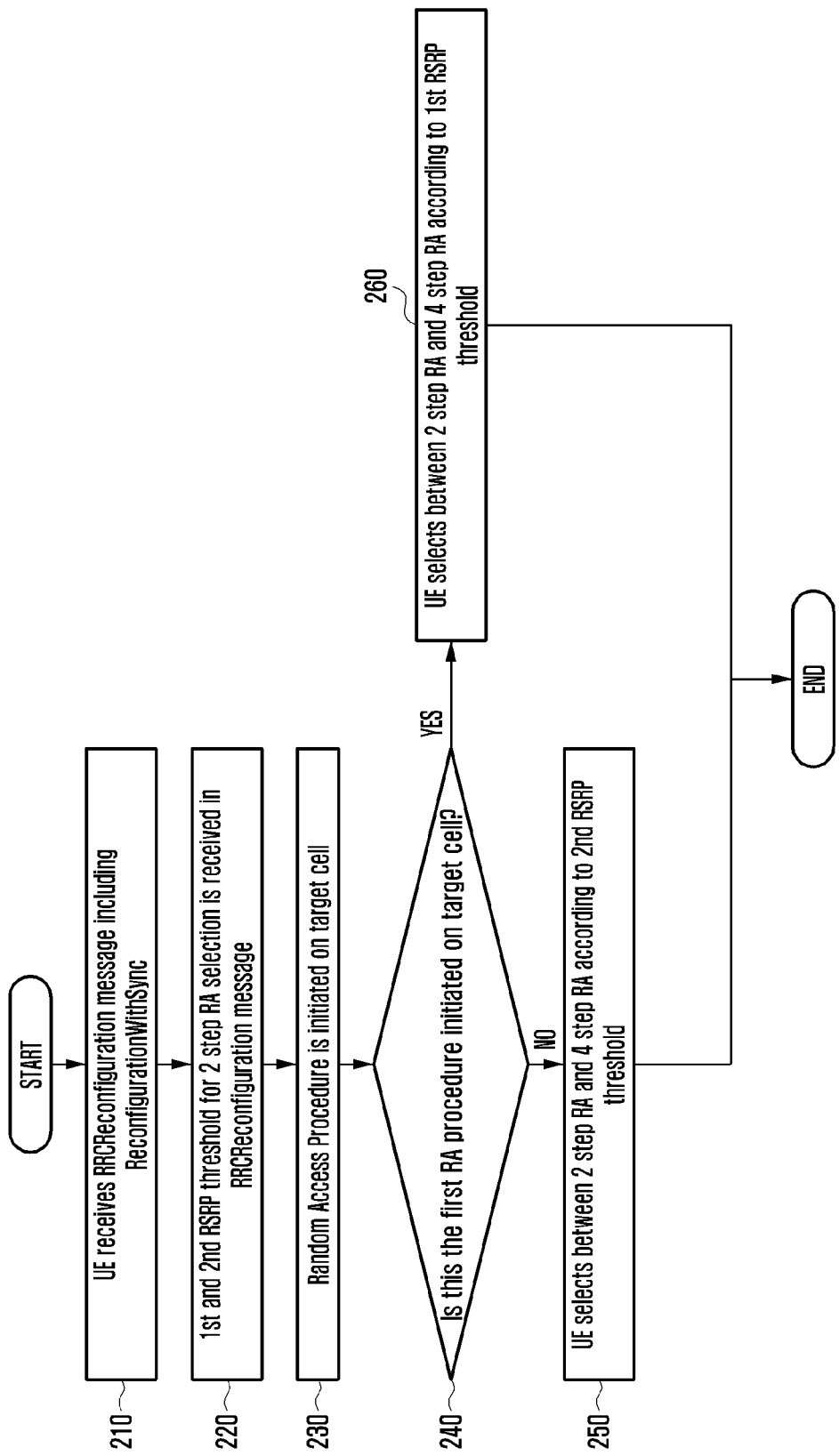
FIG. 2 illustrates a flow chart of a method for handling reference signal received power (RSRP) thresholds in accordance with an embodiment of the disclosure.

FIG. 2 illustrates a flow chart of a method for handling reference signal received power (RSRP) thresholds in accordance with an embodiment of the disclosure.

Method 2-1: In NR, reconfiguration procedure as specified in TS 38.331, is used to modify an RRC connection, e.g., to establish/modify/release radio bearers (RBs), to perform reconfiguration with sync, to setup/modify/release measurements, to add/modify/release SCells and cell groups. If the UE receives RRCReconfiguration message wherein CellGroupConfig IE in RRCReconfiguration message contains the spCellConfig with reconfigurationWithSync, the UE performs Reconfiguration with sync procedure. During this procedure, the UE synchronize to the DL of the target SpCell and acquire the MIB of the target SpCell by receiving and decoding the PBCH of target SpCell. The UE then initiate the random access towards the target SpCell. If the target SpCell is PCell, RRCConnectionReconfigurationComplete message is transmitted to target SpCell. Otherwise it is transmitted on Source PCell.

According to an embodiment of FIG. 2, a UE receives RRCReconfiguration message including ReconfigurationWithSync from serving cell (210).

1st and 2nd RSRP thresholds for 2 step RA selection are received in RRCReconfiguration message (220).
  1st RSRP threshold is received in ReconfigurationWithSync IE (can be included in rach-ConfigDedicated IE in ReconfigurationWithSync)
  2nd RSRP threshold is received in ServingCellConfigCommon IE (can be included in RACH configuration)
    Note that 2nd RSRP threshold can be BWP specific i.e., separately configured for each BWP.
  the UE synchronizes to target cell and initiates random access procedure for reconfiguration with sync (230).

For this first random access procedure initiated on target cell (240), the UE selects between 2 step RA and 4 step RA according to 1st RSRP threshold (260). Note that both 2 step and 4 step RA resources are configured in target cell in the BWP selected for random access.

RRCConnectionReconfigurationComplete message is successfully transmitted

RA is triggered again (e.g., for requesting UL resource or BFR or initiated by PDCCH order, etc.) (240).

For this (i.e., other than the first one) random access procedure initiated on target cell (240), the UE selects between 2 step RA and 4 step RA according to 2nd RSRP threshold (250). If the 2nd RSRP threshold is BWP specific, the threshold configured for BWP where the UE performs random access is used. Note that both 2 step and 4 step RA resources are configured in target cell in the BWP selected for random access.

Figure 3:
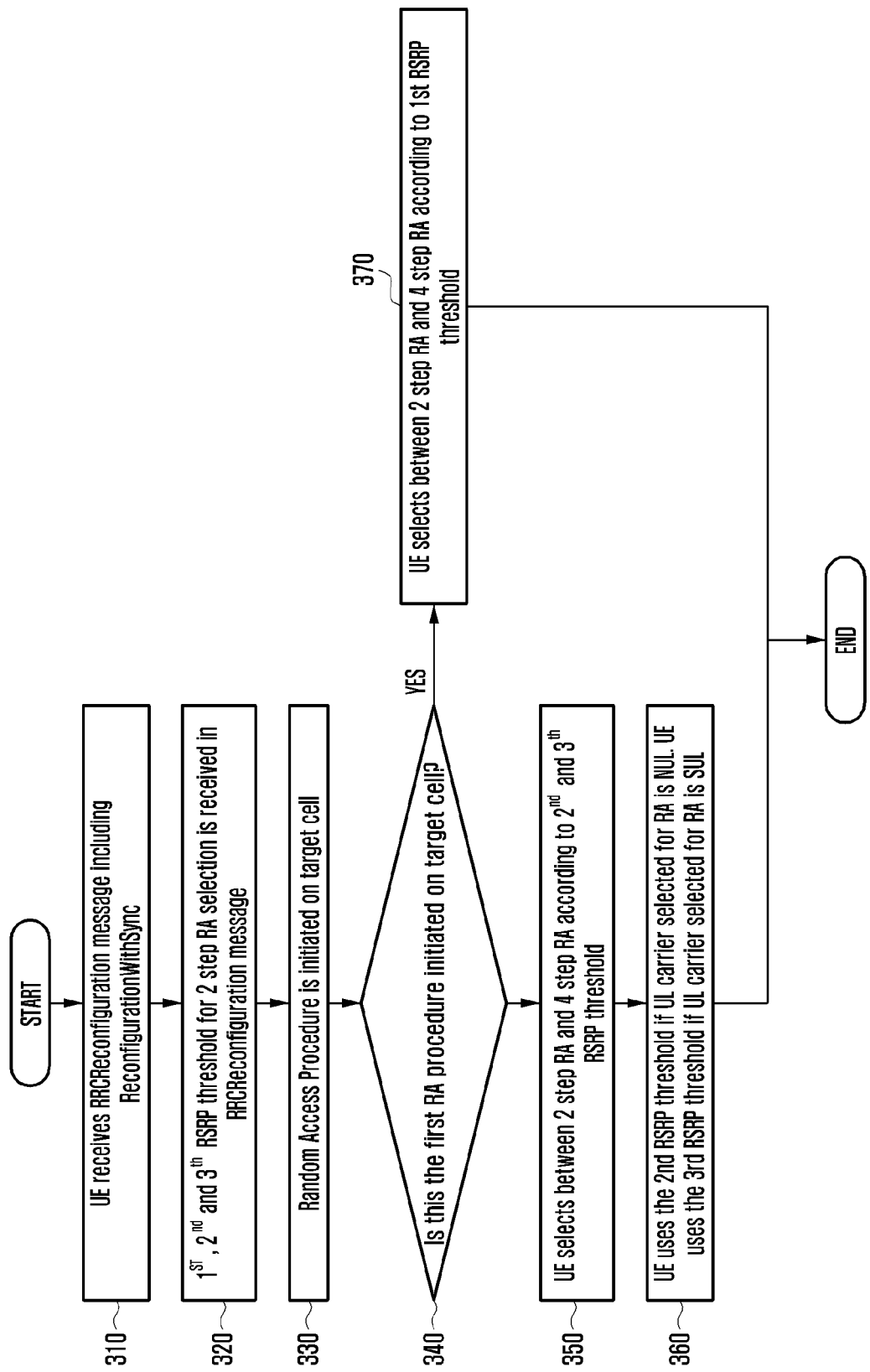
FIG. 3 illustrates a flow chart of a method for handling RSRP thresholds in accordance with another embodiment of the disclosure.

FIG. 3 illustrates a flow chart of a method for handling RSRP thresholds in accordance with another embodiment of the disclosure.

Method 2-2: In NR, reconfiguration procedure as specified in TS 38.331, is used to modify an RRC connection, e.g., to establish/modify/release radio bearers (RBs), to perform reconfiguration with sync, to setup/modify/release measurements, to add/modify/release SCells and cell groups. If the UE receives RRCReconfiguration message wherein CellGroupConfig IE in RRCReconfiguration message contains the spCellConfig with reconfigurationWithSync, the UE performs Reconfiguration with sync procedure. During this procedure, the UE synchronizes to the DL of the target SpCell and acquire the MIB of the target SpCell by receiving and decoding the PBCH of target SpCell. The UE then initiate the random access towards the target SpCell. If the target SpCell is PCell, RRCConnectionReconfigurationComplete message is transmitted to target SpCell. Otherwise it is transmitted on Source PCell.

According to an embodiment of FIG. 3, the UE receives RRCReconfiguration message including ReconfigurationWithSync from serving cell (310).

1st, 2nd and 3rd RSRP thresholds for 2 step RA selection are received in RRCReconfiguration message (320).
  1st RSRP threshold is received in ReconfigurationWithSync IE (can be included in rach-ConfigDedicated IE in ReconfigurationWithSync).
  2nd and 3rd RSRP thresholds are received in ServingCellConfigCommon IE (can be included in RACH configuration).
    Note that 2nd and 3rd RSRP thresholds can be BWP specific i.e., separately configured for each BWP.

The UE synchronizes to target cell and initiates random access procedure for reconfiguration with sync (330).

For this first random access procedure initiated on target cell (340), the UE selects between 2 step RA and 4 step RA according to 1st RSRP threshold (370).

RRCConnectionReconfigurationComplete message is successfully transmitted.

RA is triggered again (e.g., for requesting UL resource or BFR or initiated by PDCCH order, etc.) (340).

For this (i.e., other than the first one) random access procedure initiated on target cell (340), the UE selects between 2 step RA and 4 step RA according to 2nd and 3rd RSRP thresholds (350). If the 2nd and 3rd RSRP thresholds are BWP specific, the thresholds configured for BWP where the UE performs random access are used. The UE uses the 2nd RSRP threshold if UL carrier selected for RA is NUL. The UE uses the 3rd RSRP threshold if UL carrier selected for RA is SUL (360).

Embodiment 3—Selection Between 2 Step and 4 Step RA

In NR, reconfiguration procedure as specified in TS 38.331, is used to modify an RRC connection, e.g., to establish/modify/release radio bearers (RBs), to perform reconfiguration with sync, to setup/modify/release measurements, to add/modify/release SCells and cell groups. If the UE receives RRCReconfiguration message wherein CellGroupConfig IE in RRCReconfiguration message contains the spCellConfig with reconfigurationWithSync, the UE performs Reconfiguration with sync procedure. During this procedure, the UE synchronize to the DL of the target SpCell and acquire the MIB of the target SpCell by receiving and decoding the PBCH of target SpCell. The UE then initiate the random access towards the target SpCell. If the target SpCell is PCell, RRCConnectionReconfigurationComplete message is transmitted to target SpCell. Otherwise it is transmitted on Source PCell. In the reconfigurationWithSync, dedicated RACH configuration can be signaled by a gNB and one of the following configurations can be supported for the dedicated RACH configuration in the received RRCReconfiguration message (dedicated RACH configuration is signaled using rach-ConfigDedicated IE in RRCReconfiguration message; CFRA configuration (i.e., legacy CFRA/4step CFRA) is provided by including field "cfra" and 2 step CFRA configuration is provided by including field cfra-TwpStep in rach-ConfigDedicated):

CFRA configuration is included, 2 step CFRA configuration is not included 2 step CFRA configuration is included, CFRA configuration is not included Both CFRA and 2 step CFRA configurations are included CFRA configuration is not included, 2 step CFRA configuration is not included DL RSRP for RA type selection: In an embodiment of the disclosure, a UE measures the DL RSRP of serving cell on which random access is initiated (i.e., the cell on which the UE may transmit Msg1 for 4 step random access and MsgA for 2 step random access). In an embodiment, the DL RSRP is the RSRP derived from SSB measurements of cell on which random access is initiated (i.e., the cell on which the UE may transmit Msg1 for 4 step random access and MsgA for 2 step random access).

In another embodiment DL RSRP is the RSRP of the downlink pathloss reference. The downlink pathloss reference can be synchronization signal i.e., SSB. The downlink pathloss reference can be SSB which is selected for selecting PRACH resource (preamble, PRACH occasion) and PUSCH resource for MsgA transmission. In another embodiment, the DL RSRP is the synchronization signal-RSRP (SS-RSRP) of best SSB (i.e., highest RSRP value among the SS-RSRP value of all SSBs). In another embodiment, the DL RSRP is the DL RSRP of cell on which random access is initiated (i.e., the cell on which a UE may transmit Msg1 for 4 step random access and MsgA for 2 step random access), and is obtained as follows: maximum number (nrofSS-ResourcesToAverage) of beams (or SSBs) and a threshold (absThreshSS-Consolidation) are signaled by a gNB. The UE obtains them from SI or RRC signaling. If the highest SS-RSRP value among the SS-RSRP values of all SSBs (or beams) is below the threshold, DL RSRP of cell is the highest SS-RSRP value among the SS-RSRP values of all SSBs. Otherwise, DL RSRP of cell is the linear average of the SS-RSRP of up to the maximum number (nrofSS-ResourcesToAverage) of highest SS-RSRP values above the threshold. In an embodiment, DL RSRP of cell can be CSI-RSRP.

Method 3-1:

A UE receives RRCReconfiguration message including ReconfigurationWithSync from serving cell. ReconfigurationWithSync IE in included in SpCell configuration in RRCReconfiguration message.

The UE synchronizes to target SpCell and initiates random access procedure for reconfiguration with sync. Depending on the configuration, the UE operation is explained below. Here it is assumed that both 2 step CBRA and 4 step CBRA are configured in BWP selected for random access (in other words, both 2 step and 4 step RA are configured in BWP selected for random access). 4 step RA is configured by including field in BWP configuration which provides the 4 step RA configuration (e.g., rach-ConfigCommon field in BWP configuration). 2 step RA is configured by including field in BWP configuration which provides the 2 step RA configuration (e.g., msgA-ConfigCommon field in BWP configuration).

Case 3-1-1: If only legacy CFRA resources are configured (i.e., 2 step CFRA resources are not configured) in the received RRCReconfiguration message the UE selects type of RA as follows:

If DL RSRP> Threshold at the time of initiation of RA procedure:

For each RA attempt of RA procedure, the UE selects between legacy CFRA and 2 step CBRA. If there is at least one SSB/CSI RS with SS-RSRP/CSI-RS RSRP above a configured threshold amongst the SSBs/CSI-RSs for which legacy contention free random access resources is provided by a gNB is available, the UE performs legacy CFRA, i.e., in this case the UE transmits Msg1 using the contention free resources and receives Msg2 as explained earlier. If there is no SSB/CSI RS with SS-RSRP/CSI-RS RSRP above a configured threshold amongst the SSBs/CSI-RSs for which legacy contention free random access resources is provided by a gNB, the UE performs 2 step CBRA, i.e., in this case the UE transmits MsgA (i.e., preamble and payload) using the contention based random access resources and receive MsgB as explained earlier.

Else if DL RSRP<=Threshold at the time of initiation of RA procedure:

For each RA attempt of RA procedure, the UE selects between legacy CFRA and 4 step CBRA. If there is at least one SSB/CSI RS with SS-RSRP/CSI-RS RSRP above a configured threshold amongst the SSBs/CSI-RSs for which legacy contention free random access resources is provided by a gNB is available, the UE performs legacy CFRA, i.e., in this case the UE transmits Msg1 using the contention free resources and receives Msg2 as explained earlier. If there is no SSB/CSI RS with SS-RSRP/CSI-RS RSRP above a configured threshold amongst the SSBs/CSI-RSs for which legacy contention free random access resources is provided by a gNB, the UE performs 4 step CBRA, i.e., in this case the UE transmits Msg1 (i.e., preamble only) using the contention based random access resources and receive/transmit Msg2/Msg3/Msg4 as explained earlier.

Case 3-1-2: If only 2 step CFRA resources are configured (i.e., legacy CFRA resources are not configured) in the received RRCReconfiguration message the UE selects type of RA as follows:

If DL RSRP> Threshold at the time of initiation of RA procedure:

For each RA attempt of RA procedure, the UE selects between 2 step CFRA and 2 step CBRA. If there is at least one SSB/CSI RS with SS-RSRP/CSI-RS RSRP above a configured threshold amongst the SSBs/CSI-RSs for which 2 step contention free random access resources is provided by a gNB is available, the UE performs 2 step CFRA, i.e., in this case the UE transmits MsgA (i.e., preamble and payload) using the contention free resources and receives MsgB as explained earlier. If there is no SSB/CSI RS with SS-RSRP/CSI-RS RSRP above a configured threshold amongst the SSBs/CSI-RSs for which 2 step contention free random access resources is provided by a gNB, the UE performs 2 step CBRA, i.e., in this case the UE transmits MsgA (i.e., preamble and payload) using the contention based random access resources and receive MsgB as explained earlier.

Else if DL RSRP<=Threshold at the time of initiation of RA procedure:

For each RA attempt of RA procedure, the UE selects between 2 step CFRA and 4 step CBRA. If there is at least one SSB/CSI RS with SS-RSRP/CSI-RS RSRP above a configured threshold amongst the SSBs/CSI-RSs for which 2 step contention free random access resources is provided by a gNB is available, the UE performs 2 step CFRA, i.e., in this case the UE transmits MsgA (i.e., preamble and payload) using the contention free resources and receives MsgB as explained earlier. If there is no SSB/CSI RS with SS-RSRP/CSI-RS RSRP above a configured threshold amongst the SSBs/CSI-RSs for which 2 step contention free random access resources is provided by gNB, the UE performs 4 step CBRA, i.e., in this case the UE transmits Msg1 (i.e., preamble only) using the contention based random access resources and receive/transmit Msg2/Msg3/Msg4 as explained earlier.

(Alternate) For each RA attempt of RA procedure i.e., during random access resource selection, the UE performs 4 step CBRA i.e., in this case the UE transmits Msg1 (i.e., preamble only) using the contention based random access resources and receive/transmit Msg2/Msg3/Msg4 as explained earlier.

Case 3-1-3: If both 2 step CFRA resources are configured and legacy CFRA resources are configured in the received RRCReconfiguration message, the UE selects type of RA as follows:

If DL RSRP> Threshold at the time of initiation of RA procedure:

For each RA attempt of RA procedure i.e., during random access resource selection, the UE selects between 2 step CFRA and 2 step CBRA. If there is at least one SSB/CSI RS with SS-RSRP/CSI-RS RSRP above a configured threshold amongst the SSBs/CSI-RSs for which 2 step contention free random access resources is provided by a gNB is available, the UE performs 2 step CFRA, i.e., in this case the UE transmits MsgA (i.e., preamble and payload) using the contention free resources and receives MsgB as explained earlier. If there is no SSB/CSI RS with SS-RSRP/CSI-RS RSRP above a configured threshold amongst the SSBs/CSI-RSs for which 2 step contention free random access resources is provided by a gNB, the UE performs 2 step CBRA, i.e., in this case the UE transmits MsgA (i.e., preamble and payload) using the contention based random access resources and receive MsgB as explained earlier.

Else if DL RSRP<=Threshold at the time of initiation of RA procedure:

For each RA attempt of RA procedure i.e., during random access resource selection, the UE selects between legacy CFRA and 4 step CBRA. If there is at least one SSB/CSI RS with SS-RSRP/CSI-RS RSRP above a configured threshold amongst the SSBs/CSI-RSs for which legacy contention free random access resources is provided by a gNB is available, the UE performs legacy CFRA i.e., in this case the UE transmits Msg1 (i.e., preamble only) using the contention free resources and receives Msg2 as explained earlier. If there is no SSB/CSI RS with SS-RSRP/CSI-RS RSRP above a configured threshold amongst the SSBs/CSI-RSs for which legacy contention free random access resources is provided by a gNB, the UE performs 4 step CBRA, i.e., in this case the UE transmits Msg1 (i.e., preamble only) using the contention based random access resources and receive/transmit Msg2/Msg3/Msg4 as explained earlier.

Case 3-1-4: If neither 2 step CFRA resources are configured nor legacy CFRA resources are configured in the received RRCReconfiguration message, the UE selects type of RA as follows:

If DL RSRP> Threshold at the time of initiation of RA procedure:

For each RA attempt of RA procedure, a UE performs 2 step CBRA i.e., in this case the UE transmits MsgA (i.e., preamble and payload) using the contention based random access resources and receive MsgB as explained earlier.

Else if DL RSRP<=Threshold at the time of initiation of RA procedure:

For each RA attempt of RA procedure, a UE performs 4 step CBRA i.e., in this case the UE transmits Msg1 (i.e., preamble only) using the contention based random access resources and receive/transmit Msg2/Msg3/Msg4 as explained earlier.

Method 3-2:

a UE receives RRCReconfiguration message including ReconfigurationWithSync from serving cell. ReconfigurationWithSync IE is included in SpCell configuration in RRCReconfiguration message.

the UE synchronizes to target cell and initiates random access procedure for reconfiguration with sync. Depending on the configuration a UE operation is explained below. Here it is assumed that both 2 step CBRA and 4 step CBRA is configured in BWP selected for random access (in other words, both 2 step and 4 step RA are configured in BWP selected for random access). 4 step RA is configured by including field in BWP configuration which provides the 4 step RA configuration (e.g., rach-ConfigCommon field in BWP configuration). 2 step RA is configured by including field in BWP configuration which provides the 2 step RA configuration (e.g., msgA-ConfigCommon field in BWP configuration).

Case 3-2-1: If only legacy CFRA resources are configured (i.e., 2 step CFRA resources are not configured) in the received RRCReconfiguration message the UE selects type of RA as follows:

the UE selects 4 step RA. For each RA attempt of RA procedure, the UE selects between legacy CFRA and 4 step CBRA. If there is at least one SSB/CSI RS with SS-RSRP/CSI-RS RSRP above a configured threshold amongst the SSBs/CSI-RSs for which legacy contention free random access resources is provided by a gNB is available, the UE performs legacy CFRA, i.e., in this case the UE transmits Msg1 using the contention free random access resources and receives Msg2 as explained earlier. If there is no SSB/CSI RS with SS-RSRP/CSI-RS RSRP above a configured threshold amongst the SSBs/CSI-RSs for which legacy contention free random access resources is provided by a gNB, the UE performs 4 step CBRA, i.e., in this case the UE transmits Msg1 (i.e., preamble only) using the contention based random access resources and receive/transmit Msg2/Msg3/Msg4 as explained earlier.

Case 3-2-2: If only 2 step CFRA resources are configured (i.e., legacy CFRA resources are not configured) in the received RRCReconfiguration message the UE selects type of RA as follows:

the UE selects 2 step RA. For each RA attempt of RA procedure, the UE selects between 2 step CFRA and 2 step CBRA. If there is at least one SSB/CSI RS with SS-RSRP/CSI-RS RSRP above a configured threshold amongst the SSBs/CSI-RSs for which 2 step contention free random access resources is provided by a gNB is available, the UE performs 2 step CFRA, i.e., in this case the UE transmits MsgA (i.e., preamble and payload) using the contention free resources and receives MsgB as explained earlier. If there is no SSB/CSI RS with SS-RSRP/CSI-RS RSRP above a configured threshold amongst the SSBs/CSI-RSs for which 2 step contention free random access resources is provided by a gNB, the UE performs 2 step CBRA, i.e., in this case the UE transmits MsgA (i.e., preamble and payload) using the contention based random access resources and receive MsgB as explained earlier.

Case 3-2-3: If both 2 step CFRA resources are configured and legacy CFRA resources are configured in the received RRCReconfiguration message, the UE selects type of RA as follows:

If DL RSRP> Threshold at the time of initiation of RA procedure:

the UE selects 2 step RA. For each RA attempt of 2 step RA procedure i.e., during random access resource selection, the UE selects between 2 step CFRA and 2 step CBRA. If there is at least one SSB/CSI RS with SS-RSRP/CSI-RS RSRP above a configured threshold amongst the SSBs/CSI-RSs for which 2 step contention free random access resources is provided by a gNB is available, the UE performs 2 step CFRA, i.e., in this case the UE transmits MsgA (i.e., preamble and payload) using the contention free resources and receives MsgB as explained earlier. If there is no SSB/CSI RS with SS-RSRP/CSI-RS RSRP above a configured threshold amongst the SSBs/CSI-RSs for which 2 step contention free random access resources is provided by a gNB, the UE performs 2 step CBRA, i.e., in this case the UE transmits MsgA (i.e., preamble and payload) using the contention based random access resources and receive MsgB as explained earlier.

Else if DL RSRP<=Threshold at the time of initiation of RA procedure:

the UE selects 4 step RA. For each RA attempt of 4 step RA procedure i.e., during random access resource selection, the UE selects between legacy CFRA and 4 step CBRA. If there is at least one SSB/CSI RS with SS-RSRP/CSI-RS RSRP above a configured threshold amongst the SSBs/CSI-RSs for which legacy contention free random access resources is provided by a gNB is available, the UE performs legacy CFRA, i.e., in this case the UE transmits Msg1 (i.e., preamble only) using the contention free resources and receives Msg2 as explained earlier. If there is no SSB/CSI RS with SS-RSRP/CSI-RS RSRP above a configured threshold amongst the SSBs/CSI-RSs for which legacy contention free random access resources is provided by a gNB, the UE performs 4 step CBRA, i.e., in this case the UE transmits Msg1 (i.e., preamble only) using the contention based random access resources and receive/transmit Msg2/Msg3/Msg4 as explained earlier.

Case 3-2-4: If neither 2 step CFRA resources are configured nor legacy CFRA resources are configured in the received RRCReconfiguration message, the UE selects type of RA as follows:

If DL RSRP> Threshold at the time of initiation of RA procedure:

the UE selects 2 step RA. For each RA attempt of 2 step RA procedure, the UE performs 2 step CBRA i.e., in this case the UE transmits MsgA (i.e., preamble and payload) using the contention based random access resources and receive MsgB as explained earlier.

Else if DL RSRP<=Threshold at the time of initiation of RA procedure:

the UE selects 4 step RA. For each RA attempt of 4 step RA procedure, the UE performs 4 step CBRA i.e., in this case the UE transmits Msg1 (i.e., preamble only) using the contention based random access resources and receive/transmit Msg2/Msg3/Msg4 as explained earlier.

Note that in this method in certain cases RSRP threshold is not used for RA type selection for 1st RA procedure initiated upon receiving RRCReconfiguration message including ReconfigurationWithSync. If CFRA resource is configured in the received RRCReconfiguration message, selection between 2 step RA and 4 step RA is not based on RSRP threshold. If 2 step CFRA resources are configured in the received RRCReconfiguration message, perform 2 step RA (2 step CFRA/2 step CBRA). If 4 step CFRA resources are configured in the received RRCReconfiguration message, perform 4 step RA (CFRA/4 step CBRA).

Note that above method can also be applied for beam failure recovery if 2 step CFRA is supported for beam failure recovery.

Alternate:

a UE receives RRCReconfiguration message including ReconfigurationWithSync. ReconfigurationWithsync IE is included in SpCell configuration in RRCReconfiguration message.

RSRP threshold is received in RRCReconfiguration message

RSRP threshold is received in ServingCellConfigCommon IE the UE synchronizes to target SpCell and initiates random access procedure for reconfiguration with sync For this first random access procedure initiated on target SpCell, If CFRA resource is configured, selection between 2 step RA and 4 step RA is not based on RSRP threshold If 2 step CFRA is configured in the received RRCReconfiguration message, perform 2 step RA If 4 step CFRA is configured in the received RRCReconfiguration message, perform 4 step RA If CFRA resource is not configured (i.e., neither 2 step CFRA or 4 step CFRA/legacy CFRA is configured) in the received RRCReconfiguration message, selection between 2 step RA and 4 step RA is according to RSRP threshold RRCConnectionReconfigurationComplete message is successfully transmitted RA is triggered again (e.g., for requesting UL resource or BFR or initiated by PDCCH order, etc.)

For this other (i.e., other than first) random access procedure initiated on target SpCell, the UE selects between 2 step RA and 4 step RA according to RSRP threshold Method 3-3: Handling RA Type Selection for BFR Initiated RA.

the UE receives RRCReconfiguration message including beam failure recovery configuration. 2 step CFRA is not supported for BFR.

Beam failure is detected and random access procedure is initiated for beam failure recovery. Depending on the configuration in the BWP selected for random access the UE operation is explained below. Here it is assumed that both 2 step CBRA and 4 step CBRA is configured in BWP selected for random access (in other words, both 2 step and 4 step RA are configured in BWP selected for random access). 4 step RA is configured by including field in BWP configuration which provides the 4 step RA configuration (e.g., rach-ConfigCommon field in BWP configuration). 2 step RA is configured by including field in BWP configuration which provides the 2 step RA configuration (e.g., msgA-ConfigCommon field in BWP configuration).

Case 3-3-1: If only legacy CFRA resources are configured (i.e., 2 step CFRA resources are not configured) for beam failure recovery in the BWP selected for random access the UE selects type of RA as follows:

For each RA attempt of RA procedure, the UE selects between legacy CFRA and 4 step CBRA. If there is at least one SSB/CSI RS with SS-RSRP/CSI-RS RSRP above a configured threshold amongst the SSBs/CSI-RSs for which legacy contention free random access resources is provided by a gNB is available, the UE performs legacy CFRA, i.e., in this case the UE transmits Msg1 using the contention free resources and receives Msg2 as explained earlier. If there is no SSB/CSI RS with SS-RSRP/CSI-RS RSRP above a configured threshold amongst the SSBs/CSI-RSs for which legacy contention free random access resources is provided by a gNB, the UE performs 4 step CBRA, i.e., in this case the UE transmits Msg1 (i.e., preamble only) using the contention based random access resources and receive/transmit Msg2/Msg3/Msg4 as explained earlier.

Case 3-3-2: if legacy CFRA resources are not configured for beam failure recovery in the BWP selected for random access, the UE selects type of RA as follows:

If DL RSRP> Threshold at the time of initiation of RA procedure:

For each RA attempt of RA procedure, the UE performs 2 step CBRA, i.e., in this case the UE transmits MsgA (i.e., preamble and payload) using the contention based random access resources and receive MsgB as explained earlier.

Else if DL RSRP<=Threshold at the time of initiation of RA procedure:

For each RA attempt of RA procedure, the UE performs 4 step CBRA i.e., in this case the UE transmits Msg1 (i.e., preamble only) using the contention based random access resources and receive/transmit Msg2/Msg3/Msg4 as explained earlier.

In this method if CFRA resources are configured for beam failure recovery, in the BWP selected for random access a UE follows the legacy random access procedure, i.e., for each RA attempt of RA procedure the UE selects between legacy CFRA and 4 step CBRA. If CFRA resources are not configured and both 2 step CBRA and 4 step CBRA resources are configured in BWP selected for RA procedure, the UE select between 2 step CBRA and 4 step CBRA based on RSRP threshold as explained above. If CFRA resources are not configured and only 4 step CBRA resources are configured in BWP selected for RA procedure, the UE performs 4 step CBRA.

Method 3-4: Handling RA type selection for PDCCH order initiated RA.

a UE receives PDCCH order for initiating random access from gNB

If contention free resource is included in PDCCH order (i.e., ra-PreambleIndex is included in PDCCH and is not 0b000000), for each RA attempt of RA procedure, the UE performs legacy CFRA using the indicated contention free resource (i.e., the UE may select the indicated preamble and SSB for Msg1 transmission).

if contention free resource is not included in PDCCH order and both 2 step CBRA and 4 step CBRA are configured in BWP selected for RA procedure, the UE selects type of RA as follows:

If DL RSRP> Threshold at the time of initiation of RA procedure:
  the UE performs 2 step CBRA i.e., in this case the UE transmits MsgA (i.e., preamble and payload) using the contention based random access resources and receive MsgB as explained earlier.
Else if DL RSRP<=Threshold at the time of initiation of RA procedure:
  the UE performs 4 step CBRA i.e., in this case the UE transmits Msg1 (i.e., preamble only) using the contention based random access resources and receive/transmit Msg2/Msg3/Msg4 as explained earlier.

if contention free resource is not included in PDCCH order and only 4 step CBRA is configured in BWP selected for RA procedure, the UE selects type of RA as follows:
  the UE performs 4 step CBRA i.e., in this case the UE transmits Msg1 (i.e., preamble only) using the contention based random access resources and receive/transmit Msg2/Msg3/Msg4 as explained earlier.

Embodiment 4—Criteria for Successful RAR Reception for 4 Step CBRA and CFRA when RAR Window Size>10 ms After transmitting first step of random access i.e., Msg1, a UE monitors for network response in a configured response window. For extended RAR window (>10 ms), Frame Info (i.e., least significant bits (LSBs) of system frame number (SFN) of PRACH) is included in response (i.e., Msg1).

Criteria for normal RAR window:
  Received RAPID matches the transmitted PREAMBLE_INDEX, random access response reception successful Criteria for extended RAR window:
  Received RAPID matches the transmitted PREAMBLE_INDEX; and received Frame Info matches Frame Info corresponding to the SFN in which preamble was transmitted, random access response reception successful In an embodiment of this disclosure, Frame Info is used in RAR success criteria depending on whether preamble transmitted by a UE is contention based or contention free.

The UE first transmits random access preamble (also referred as Msg1) and then waits for random access response (RAR) in the RAR window. RAR is also referred as Msg2.

A next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by a gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where a UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various random access preambles detected by the gNB can be multiplexed in the same RAR media access control (MAC) protocol data unit (PDU) by the gNB.

If a downlink assignment has been received on the PDCCH for the RA-RNTI and the received TB is successfully decoded:

If random access preamble transmitted was selected from contention based preambles:
  received RAPID matches the transmitted PREAMBLE_INDEX; and
  received Frame Info matches Frame Info corresponding to the SFN in which preamble was transmitted
  random access response reception successful
Else
  received RAPID matches the transmitted PREAMBLE_INDEX;
  random access response reception successful Here frame info is the "x" LSBs of SFN of radio frame in which preamble is transmitted or radio frame in which PRACH occasion on which preamble is transmitted starts. Frame info is included in Msg2.

Figure 4:
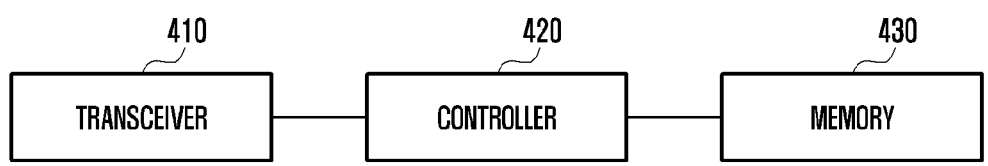
FIG. 4 is a block diagram of a terminal according to an embodiment of the disclosure.

FIG. 4 is a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), or at least one processor. The transceiver 410, the controller 420 and the memory 430 are configured to perform the operations of the UE illustrated in the figures, e.g., FIGS. 1 to 3, or described above. Although the transceiver 410, the controller 420 and the memory 430 are shown as separate entities, they may be realized as a single entity like a single chip. Or, the transceiver 410, the controller 420 and the memory 430 may be electrically connected to or coupled with each other.

The transceiver 410 may transmit and receive signals to and from other network entities, e.g., a base station.

The controller 420 may control the terminal to perform functions according to one of the embodiments described above. For example, the controller 420 controls the transceiver 410 and/or memory 430 to perform random access procedure according to various embodiments of the disclosure.

In an embodiment, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using at least one processor or a central processing unit (CPU).

Figure 5:
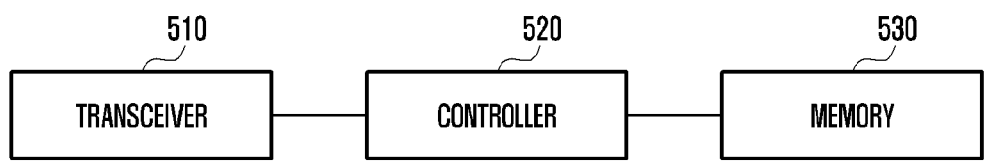
FIG. 5 is a block diagram of a base station according to an embodiment of the disclosure.

FIG. 5 is a block diagram of a base station according to an embodiment of the disclosure.

Referring to FIG. 5, a base station includes a transceiver 510, a controller 520 and a memory 530. The controller 520 may refer to a circuitry, an application-specific integrated circuit (ASIC), or at least one processor. The transceiver 510, the controller 520 and the memory 530 are configured to perform the operations of the UE illustrated in the figures, e.g., FIGS. 1 to 3, or described above. Although the transceiver 510, the controller 520 and the memory 530 are shown as separate entities, they may be realized as a single entity like a single chip. Or, the transceiver 510, the controller 520 and the memory 530 may be electrically connected to or coupled with each other.

The transceiver 510 may transmit and receive signals to and from other network entities, e.g., a terminal.

The controller 520 may control the UE to perform functions according to one of the embodiments described above. For example, the controller 520 controls the transceiver 510 and/or memory 530 to perform random access procedure according to various embodiments of the disclosure.

In an embodiment, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   obtaining configuration information associated with a random access (RA);
   in case that a random access procedure is initiated, identifying whether a contention-free random access resource is configured for a bandwidth part (BWP) associated with the random access procedure based on the configuration information associated with the RA;
   selecting a random access (RA) type for the random access procedure among a 2-step RA and a 4-step RA, based on configuration information associated with the RA; and
   performing the random access procedure based on the selected RA type,
   wherein, in case that the contention-free random access resource is configured, the RA type is selected based on the configuration information associated with the RA, and
   wherein, in case that the contention-free random access resource is not configured, the RA type is selected based on a downlink reference signal received power (RSRP) and a threshold.

2. The method of claim 1, wherein, in case that the random access procedure is initiated for reconfiguration with sync and the contention-free random access resource is configured for the BWP, the RA type is set to one of the 2-step RA or the 4-step RA based on the configuration information associated with the RA, and
   wherein, in case that the random access procedure is initiated for the reconfiguration with sync and the contention-free random access resource is not configured, the RA type is selected based on the downlink RSRP and the threshold.

3. The method of claim 1, wherein, in case that the random access procedure is initiated for beam failure recovery and the contention-free random access resource is configured for the BWP, the RA type is set to one of the 2-step RA or the 4-step RA, and
   wherein, in case that the random access procedure is initiated for the beam failure recovery and the contention-free random access resource is not configured, the RA type is selected based on the downlink RSRP and the threshold.

4. The method of claim 1, wherein, in case that the random access procedure is initiated by a physical downlink control channel (PDCCH) order and a dedicated random access preamble index configured by the PDCCH is not 0b000000, the RA type is set to the 4-step RA, and
   wherein, in case that the random access procedure is initiated by the PDCCH order, the dedicated random access preamble index configured by the PDCCH is 0b000000, and the contention-free random access resource is not configured for the BWP, the RA type is selected based on the downlink RSRP and the threshold.

5. The method of claim 1,
in case that the downlink RSRP is above the threshold, the RA type is set to the 2-step RA, and
in case that the downlink RSRP is below the threshold, the RA type is set to the 4-step RA.

6. A terminal in a wireless communication system, the terminal comprising:
a transceiver configured to transmit and receive a signal; and
a controller configured to:
obtain configuration information associated with a random access (RA),
in case that a random access procedure is initiated, identify whether a contention-free random access resource is configured for a bandwidth part (BWP) associated with the random access procedure based on the configuration information associated with the RA,
select a random access (RA) type for the random access procedure among a 2-step RA and a 4-step RA, based on configuration information associated with the RA, and
perform the random access procedure based on the selected RA type,
wherein, in case that the contention-free random access resource is configured, the RA type is selected based on the configuration information associated with the RA, and
wherein, in case that the contention-free random access resource is not configured, the RA type is selected based on a downlink reference signal received power (RSRP) and a threshold.

7. The terminal of claim 6, wherein, in case that the random access procedure is initiated for reconfiguration with sync and the contention-free random access resource is configured for the BWP, the RA type is set to one of the 2-step RA or the 4-step RA based on the configuration information associated with the RA, and
wherein, in case that the random access procedure is initiated for the reconfiguration with sync and the contention-free random access resource is not configured, the RA type is selected based on the downlink RSRP and the threshold.

8. The terminal of claim 6, wherein, in case that the random access procedure is initiated for beam failure recovery and the contention-free random access resource is configured for the BWP, the RA type is set to one of the 2-step RA or the 4-step RA, and
wherein, in case that the random access procedure is initiated for the beam failure recovery and the contention-free random access resource is not configured, the RA type is selected based on the downlink RSRP and the threshold.

9. The terminal of claim 6, wherein, in case that the random access procedure is initiated by a physical downlink control channel (PDCCH) order and a dedicated random access preamble index configured by the PDCCH is not 0b000000, the RA type is set to the 4-step RA, and
wherein, in case that the random access procedure is initiated by the PDCCH order, the dedicated random access preamble index configured by the PDCCH is 0b000000, and the contention-free random access resource is not configured for the BWP the RA type is selected based on the downlink RSRP and the threshold.

10. The terminal of claim 6,
in case that the downlink RSRP is above the threshold, the RA type is set to the 2-step RA, and
in case that the downlink RSRP is below the threshold, the RA type is set to the 4-step RA.

11. A method performed by a terminal in a wireless communication system, the method comprising:
transmitting, to a base station, a message A including a random access preamble and a payload for a random access procedure;
receiving, from the base station, a message B including fallback random access response (RAR) medium access control (MAC) sub protocol data unit (subPDU), wherein the fallback RAR MAC subPDU includes a random access preamble identifier (RAPID) matching the random access preamble and an uplink grant;
identifying whether the random access preamble was selected among contention-based random access preambles or contention-free random access preambles;
transmitting, to the base station, a MAC PDU including the payload of the message A based on the uplink grant, in case that the random access preamble was selected among the contention-free random access preambles; and
transmitting, to the base station, a MAC PDU including a message 3 based on the uplink grant, in case that the random access preamble was selected among the contention-based random access preambles.

12. The method of claim 11,
considering the random access procedure is successfully completed; and
in case that the random access preamble was selected among the contention-free random access preambles.

13. The method of claim 12, further comprising:
discarding a temporary cell-radio network temporary identifier (TC-RNTI) included in the fallback RAR MAC subPDU; and
processing a timing advance (TA) command included in the fallback RAR MAC subPDU.

14. The method of claim 11, wherein, in case that the random access preamble was selected among the contention-based random access preambles, the method further comprises:
applying a temporary cell-radio network temporary identifier (TC-RNTI) included in the fallback RAR MAC subPDU.

15. The method of claim 11, further comprising:
processing a timing advance (TA) command included in the fallback RAR MAC subPDU; and
starting a contention resolution timer after transmitting the MAC PDU including the message 3.

16. A terminal in a wireless communication system, the terminal comprising:
a transceiver configured to transmit and receive a signal; and
a controller configured to:
transmit, to a base station, a message A including a random access preamble and a payload for a random access procedure,
receive, from the base station, a message B including fallback random access response (RAR) medium access control (MAC) sub protocol data unit (subPDU), wherein the fallback RAR MAC subPDU includes a random access preamble identifier (RAPID) matching the random access preamble and an uplink grant, identify whether the random access preamble was selected among contention-based random access preambles or contention-free random access preambles, and transmit, to the base station, a MAC PDU including the payload of the message A based on the uplink grant, in case that the random access preamble was selected among the contention-free random access preambles, and transmit, to the base station, a MAC PDU including a message 3 based on the uplink grant, in case that the random access preamble was selected among the contention-based random access preambles.

17. The terminal of claim 16, wherein, in case that the random access preamble was selected among the contention-free random access preambles, the controller is further configured to consider the random access procedure is successfully completed.

18. The terminal of claim 17, wherein the controller is further configured to:

discard a temporary cell-radio network temporary identifier (TC-RNTI) included in the fallback RAR MAC subPDU, and process a timing advance (TA) command included in the fallback RAR MAC subPDU.

19. The terminal of claim 16, wherein, in case that the random access preamble was selected among the contention-based random access preambles, the controller is further configured to:

apply a temporary cell-radio network temporary identifier (TC-RNTI) included in the fallback RAR MAC subPDU.

20. The terminal of claim 17, wherein the controller is further configured to:

process a timing advance (TA) command included in the fallback RAR MAC subPDU, and start a contention resolution timer after transmitting the MAC PDU including the message 3.

* * * * *